United States Patent Office 3,285,620
Patented Nov. 15, 1966

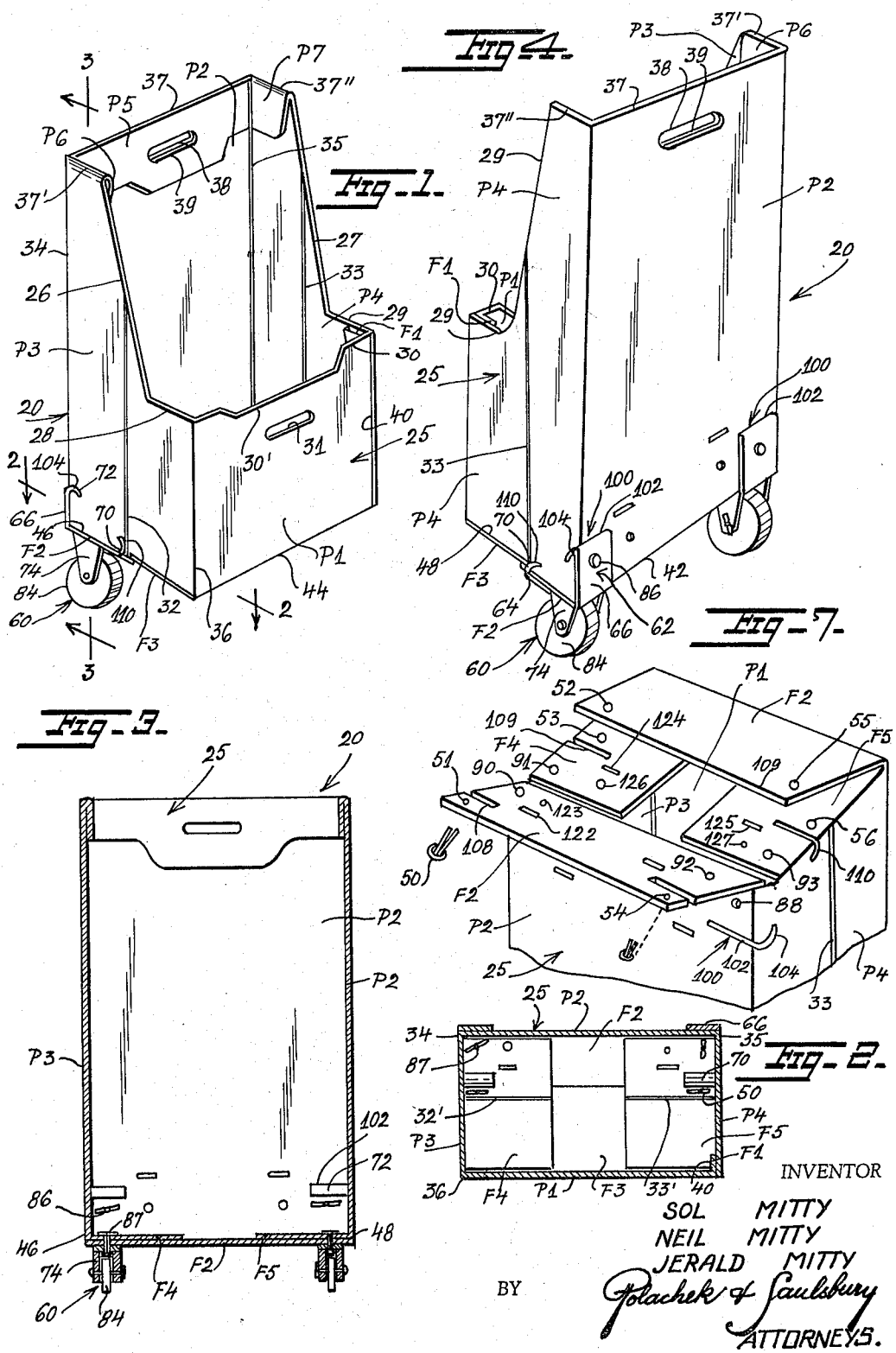

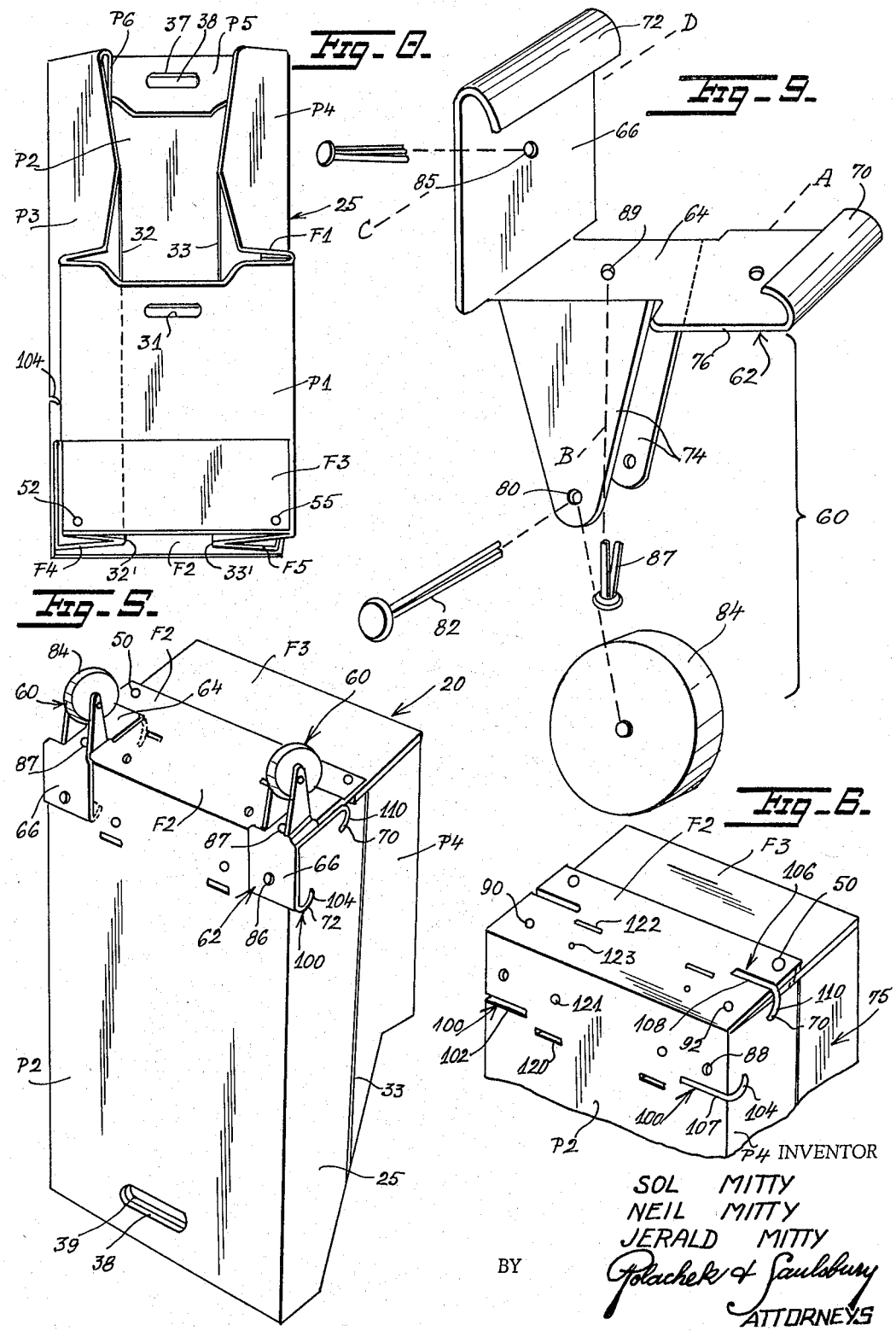

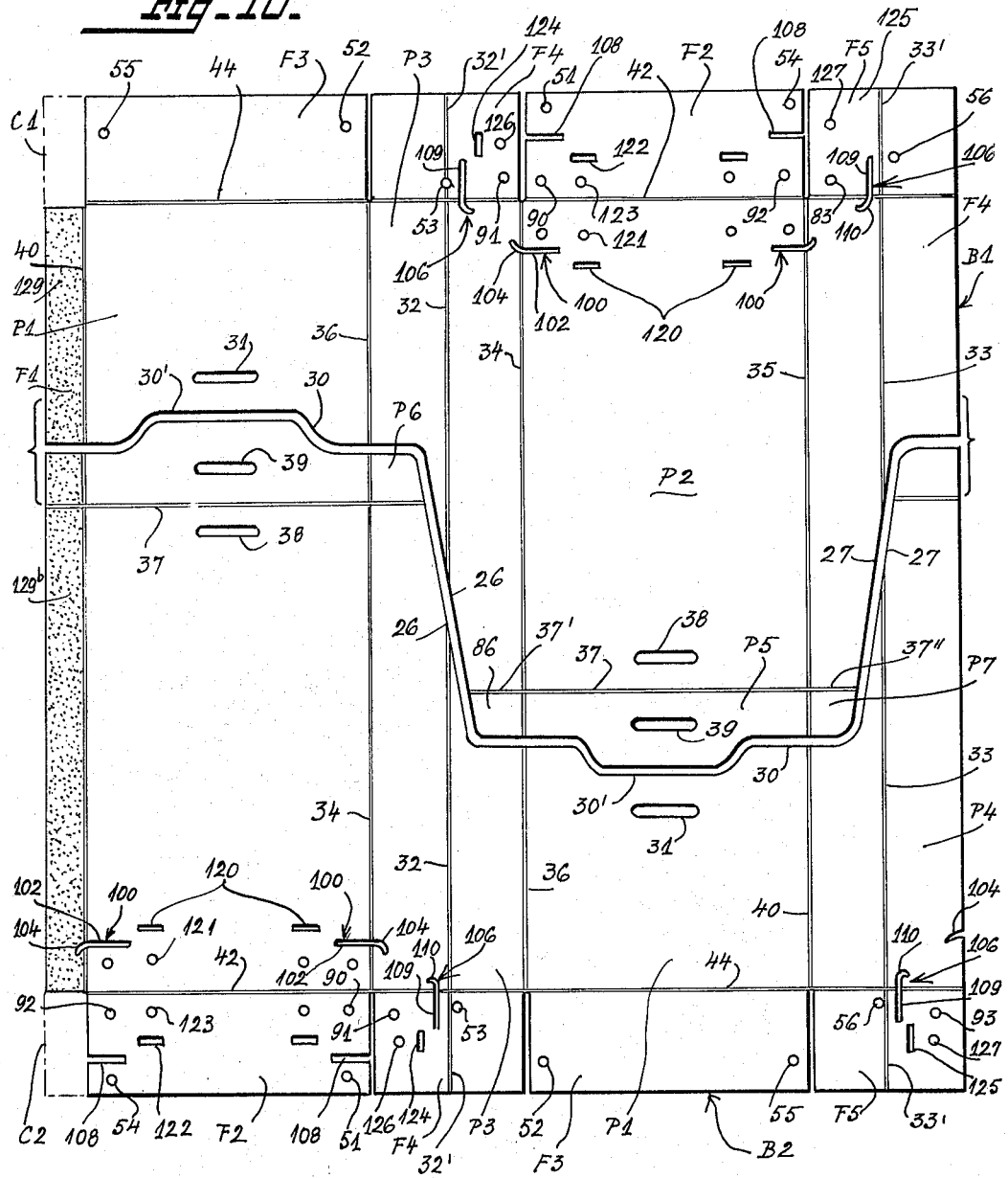

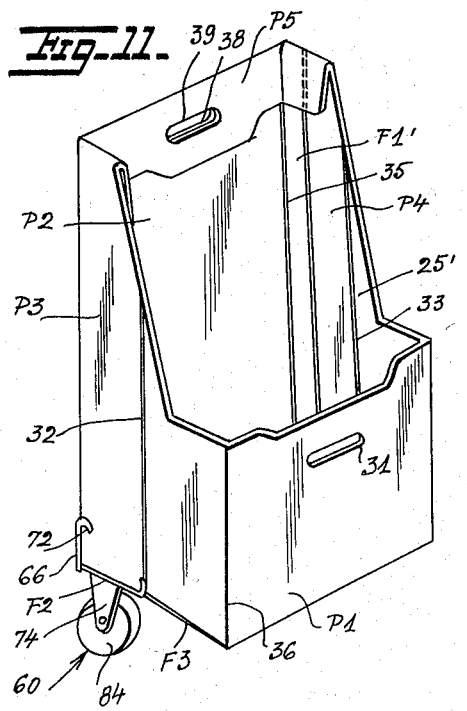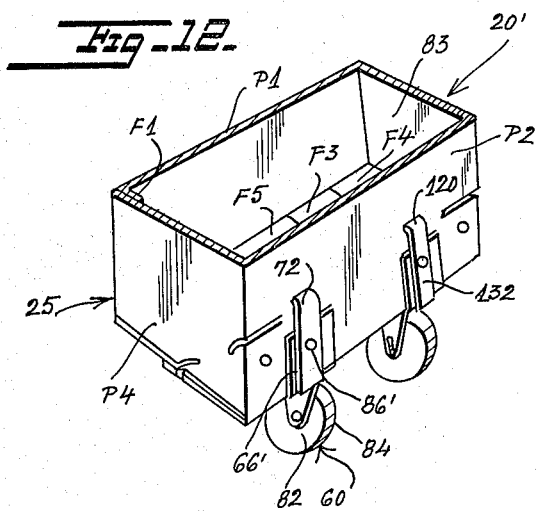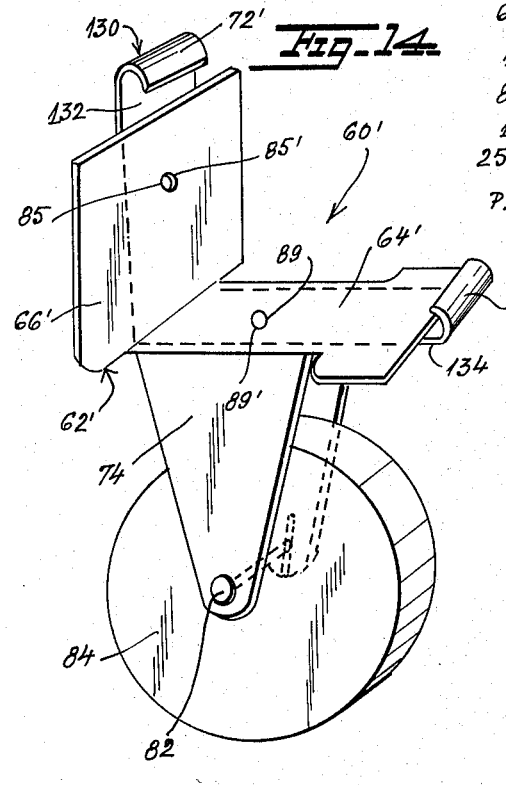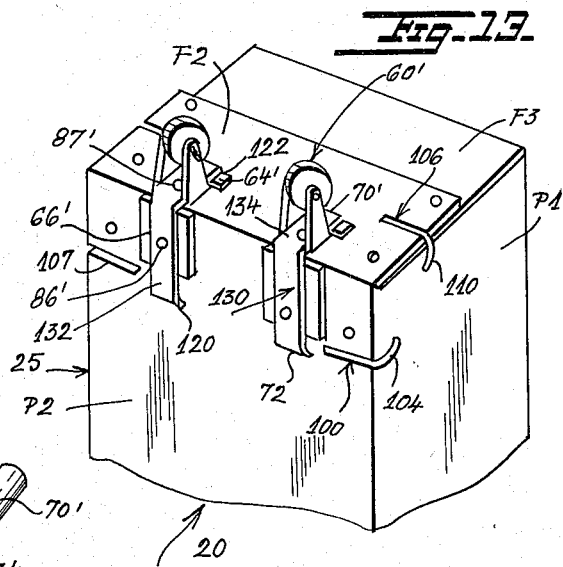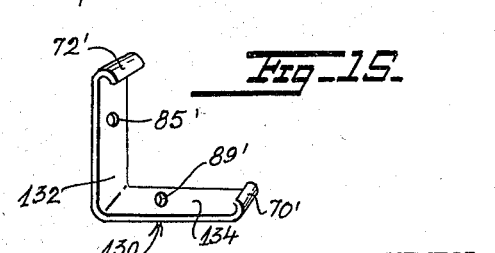

3,285,620
SHOPPING CART WITH SLIDE IN WHEEL BRACKETS
Sol Mitty, Neil Mitty, and Jerald Mitty, all of 144—45 78th Ave., Flushing, N.Y.
Filed Feb. 19, 1965, Ser. No. 433,922
8 Claims. (Cl. 280—47.26)

This invention concerns a set-up shopping cart with quick mounting wheel units.

According to the invention, there is provided a shopping cart construction in which two set-up cart bodies can be die cut from a single rectangular corrugated cardboard blank. Wheel units are provided each including a bracket, wheel and axle. The bracket is adapted to quickly engage in slots in walls of the set-up shopping cart body. The bracket may have a one-piece or two-piece construction. The wheel units are located so that they will hold bottom folded flaps of the cart body in overlapped position. The cart body has an integral handle defined by registering openings in double folded parts of the cart body. When the wheel units are detached from the cart body, the body can be folded compactly to flat form to occupy minimum space in shipment and storage. The wheel units can be slipped laterally into position in the slots or can be clamped on the bottom and back of the cart body. Double-prong button clips can be used to hold the wheel units in place on the cart body.

It is therefore a principal object of the invention to provide an improved shopping cart with quick mounting wheel holders each including a bracket and rotatable wheel.

A further object is to provide a set-up shopping cart body which can be folded flat for saving of space in storage and shipment.

Another object is to provide a set-up shopping cart construction, in which two cart bodies can be die cut from a single rectangular corrugated cardboard blank.

A further object is to provide a set-up shopping cart having a body adapted to engage a pair of wheel holding units.

Another object is to provide novel brackets for wheel holding units of a set-up shopping cart.

A further object is to provide a set-up shopping cart as described, wherein the wheels are entirely located under the bottom of the cart.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective front and side view of a shopping cart according to the invention.

FIG. 2 and FIG. 3 are horizontal and vertical sectional views taken on lines 2—2 and 3—3 respectively of FIG. 1.

FIG. 4 is a perspective rear and side view of the shopping cart of FIG. 1.

FIG. 5 is a perspective view of a shopping cart in inverted position showing rear, bottom and one side.

FIG. 6 is a perspective view of part of a shopping cart body in inverted position.

FIG. 7 is a perspective view of part of a shopping cart body with one flap open.

FIG. 8 is an oblique front view of a shopping cart body in folded, and flattened condition.

FIG. 9 is an exploded perspective view on an enlarged scale of parts of a wheel unit.

FIG. 10 is a plan view of two corrugated cardboard blanks from which set-up cart bodies can be made.

FIG. 11 is a perspective front and side view of a shopping cart having a body made from one of the blanks of FIG. 10.

FIG. 12 is a rear and side perspective view similar to a portion of FIG. 4, showing part of another cart provided with other wheel units.

FIG. 13 is a perspective view similar to a portion of FIG. 5, showing part of the cart of FIG. 12 in an inverted position.

FIG. 14 is a perspective view of a wheel unit employed in the cart of FIGS. 12, 13.

FIG. 15 is a perspective view of a clamp used with the wheel unit of FIG. 14.

Referring first to FIGS. 1–8, 12 and 13, there is shown a shopping cart 20 having a set-up body 25 made of corrugated cardboard sheet material. The body 25 has a front vertical wall panel P1 which is about half the height of rear rectangular vertical wall panel P2. Two side panels P3 and P4 joint the front and rear panels. Panels P3 and P4 have downwardly and forwardly inclined upper edges 26, 27 respectively each connecting with horizontal forward edge portions 28, 29 respectively. Edge portions 28, 29 are continuous with top edge 30 of the front panel P1. Edge 30 has a wide central notch 30' under which is centered a slot 31 defining a forward handle for the cart. Vertical centered crease lines 32, 33 in panels P3, P4 enable these panels to be folded inwardly as best shown in FIG. 8 for collapsing the cart body to a flat form. The cart body has an open top. Panels P3, P4 are integrally joined to rear panel P2 by vertical fold lines 34, 35. Panel P3 is integrally joined to front panel P1 by vertical fold line 36.

Folded forwardly over the upper end of rear panel P2 at horizontal fold line 37 is a narrow panel P5. Panels P2 and P5 have registering slots 38, 39 which serve as a hand grip. The cart body thus has an upper integral handle which is reinforced by two layers of cardboard material. Small panels P6, P7 are folded down on lines 37', 37", which are aligned with fold line 37. Panels P6 and P7 are formed at the upper ends of panels P3, P4 and serve to reinforce the cart body at upper ends of its rear corners.

A narrow vertical flap F1 is provided adjoining panel P1. This flap is secured to the forward margin of panel P4 by a suitable adhesive so that the cart body actually defines a generally rectangular tube. Flap F1 is folded rearwardly from panel P1 at fold line 40.

The cart body has a bottom flap F2 which is integrally formed with rear panel P2 and is folded forwardly from this panel at fold line 42. Flap F2 at its forward edge underlaps bottom flap F3 which is folded rearwardly at fold line 44 from front panel P1. A rectangular bottom flap F4 is folded laterally inward at horizontal fold line 46 from the bottom end of side panel P3. Flap F4 is coplanar with flap F5 which is a rectangular bottom flap folded inwardly at fold line 48 from the bottom end of side panel P4. The two horizontal bottom flaps F4, F5 overlap the forward bottom flap F3 which in turn overlaps at its rear edge flap F2; see FIGS. 2 and 3. At the corners of the bottom of the cart there are thus double layers of material and along a center, transverse portion of the bottom there are three layers where flap F4 overlaps both flaps F2, F3 and where flap F5 overlaps both flaps F2, F3. Double-pronged button clips or fasteners 50 are located at opposite ends of this transverse central triple-layer part of the bottom of the cart body. The fasteners are inserted through registering holes 51, 52 and 53 in flaps F2, F3, F4 and through registering holes 54, 55, 56 in flaps F2, F3 and F5. Flaps F4, F5 have center crease lines 32', 33' continuous with crease lines 32, 33 in panels P3, P4 to facilitate center folding of the flaps when the cart body is in flattened form as shown in FIG. 8.

The cart has two identical rear, bottom wheel units 60, shown to best advantage in FIGS. 1–5 and 9. Each wheel unit includes a generally L-shaped bracket 62 having a horizontal platform plate 64 and vertical back plate 66. The platform plate 64 terminates in an upwardly and rearwardly curved flange 70, at its forward end. The back plate terminates in a downwardly and forwardly curved flange 72 at its upper end. Two depending, vertical, generally triangular flanges 74 are located at lateral edges of a rear portion of plate 64. The rear portion of plate 64 is narrower than the front portion thereof so that the flanges are set inside of the planes defined by lateral edges 76 of the mutually perpendicular plates 64, 66. Near bottom ends of flanges 74 are aligned holes 80 which receive a cotter pin 82. This pin serves as an axle for rotatably supporting a wheel 84. Hole 85 is provided in plate 66 for receiving double-pronged fastener 86. This fastener engages in a hole 88 the back panel P2 of the cart body; see FIGS. 6, 7. Hole 89 in plate 64 receives double-prong fastener 87 which engages in registering holes 90, 91 of overlapped flaps F2, F3 or in registering holes 92, 93 of overlapped flaps F2, F4.

In order to slidably receive the upper curved flanges 72 of the wheel brackets, there are provided slots 100 which have horizontal portions 102 near opposite lateral edges of panel P2 and forwardly and downwardly curved portions 104 in the side panels P3, P4. The lower flanges 70 are slidably received in slots 106 which have horizontal portions 108, 109 in flaps F2, F4 and upwardly curved portions 110 in side panels P3, P4. By the described arrangement of slots, the wheel units can be very quickly attached to the set-up shopping cart body. The brackets slide laterally into the slots 100, 106, and then the fasteners 86, 87 can be inserted in the appropriate holes and their prongs can be spread to secure the wheel units in place. It will be noted that the wheels are located or recessed entirely under the bottom of the cart and do not project laterally or rearwardly outwardly of the planes of the vertical panels of the cart body.

FIGS. 1–7 show the cart body 25 in fully set up condition. In FIG. 8, the cart body 25 is shown in flattened condition. The wheel units are removed from the cart body so that the bottom flaps can be extended.

FIG. 10 shows two flat blanks B1 and B2 from which two set-up shopping cart bodies can be made. It will be noted that the two blanks can be die cut from a single rectangular piece of cardboard sheet material. A minimum amount of material will be wasted. The waste material includes corner portions C1 and C2 in blanks B1, B2, respectively and narrow parts cut out when the various slots are formed in the blanks. The two blanks are substantially the same and corresponding parts are identically numbered.

In each blank is the short generally rectangular panel P1 defined by vertical fold lines 36, 40. Longer panel P2 is defined by vertical fold lines 34, 35 and horizontal fold lines 37, 42. Panel P3 is located between panels P1, P2. In blank B1, panel P4 is connected to panel P2 by fold line 35. In blank B2, panel P4 is connected to panel P1 by fold line 40. In place of the short narrow flap F1 in blank B1 connected by fold 40 to panel P1, there is provided in blank B2 a longer narrow flap F1' connected to panel P2 by fold line 35. Flaps F2, F3, F4 and F5 extend outwardly of ends of panels P1, P2, P3 and P4 respectively in both blanks. Slots 100 with straight portions 102 and curved portions 104 are provided in panels P2, P3, P4. Slots 106 with straight portions 108, 109 and curved portions 110 are provided in panels P2 and flaps F2, F4, F5 of both blanks. In flaps F3 are holes 52, 55. In flaps F2 are holes 51, 54 and 90, 92. In flaps F4 are holes 53, 91 and in flaps F5 are holes 56, 93. Center crease lines 32, 32' and 33, 33' are provided in panels P3, P4 and flaps F4, F5. Handle holes 31, 38 and 39 are provided in panels P1, P2 and P5.

Cart 20' shown in FIG. 11 is substantially identical to cart 20 but the cart body 25' is made from blank B2, while the cart body 25 of cart 20 is made from blank B1. The only essential difference is that flap F1' is secured to the inner side of side panel P4 at its rear margin, while flap F1 of cart body 25 is attached to the inner side of panel P4 at its front margin. All slots and holes are located in the same places for engaging the brackets of the wheel units 60 and the several double-prong fasteners.

The blanks B1, B2 are provided with further slots and holes for quick mounting of wheel units 60' shown in FIGS. 12–15. In panel P2 of each blank is a pair of short straight slots 120 with adjacent holes 121. These slots are located near the straight portions 102 of slots 100. In flaps F2 of both blanks are short straight slots 122 located near straight slots 108 with holes 123 aligned with holes 90, 92 transversely of the flaps. In flaps F4 and F5 are short straight slots 124, 125 which register with either one of slots 122 in a flap F2 when the cart bodies are set up. Holes 126, 127 are located near slots 124, 125 respectively. Flaps F1 and F1' can be coated with suitable adhesive 129a, 129b to facilitate forming the blanks to tubular form.

Wheel unit 60' has a bracket member 62' which is similar to bracket 62 and could be made therefrom by cutting plates 64, 66 on lines A–B and C–D as indicated in FIG. 9. The bracket of unit 60' includes a narrow L-shaped clamp strip 130 shown best in FIG. 15 and a vertical wall 132 which abuts the outer side of back plate 66' and a horizontal wall 134 which abuts the underside of bottom plate 64' and fits between flanges 74 to prevent turning of member 62'. The upper end of wall 132 has a flange 72' that is bent down by the finger after it has been extended through the slot. The forward end of wall 134 has a flange 70' that is likewise bent over the slot edge to hold the bracket tight upon the unit. Holes 85', 89' in walls 132, 134 register with holes 85, 89 respectively. Other parts of the wheel unit including bracket 62' are the same as in wheel unit 60 and corresponding parts are identically numbered. FIGS. 12 and 13 show the flanges 72' engaged in the short straight slots 120 formed in back panel P2 of the cart body 25. The flanges 70' engage in the short straight slots 122 in flap F2 as well as the slots 124, 125 in flaps F4, F5 registering with slots 122. Double prong fasteners 86' engage in registering holes 85 and 85' of bracket plate 66' and clamp wall 132, and holes 121 of panel P2. Double-prong fasteners 87' engage in registering holes 89, 89' of bracket plate 64' and clamp wall 134, and holes 123, 126 and 127 of flaps F2, F4, F5.

The wheel bracket 62' is a substitute for the bracket 60 when the side slots have been damaged. The curved flanges of the bracket 60 are removed by cutting or snipping and this bendable strip 130 is used as a replacement.

The brackets 62, 62' can be made of plastic or metal material. The wheels 84 can be made of metal, plastic, wood or composition material. It shall be understood that as the wheel brackets 62 and 62' are attached to the cart, they automatically close flap F2 upon the flap F3 and since the flap F2 overlaps the flap F3, the flap F3 will be retained closed by the flap F2.

The carts 20, 20' are constructed so that they can be manufactured very economically, so that the tubular cart bodies can be packed flat for storage and shipment, so that two cart bodies can be made from a single rectangular piece of corrugated cardboard, so that the wheel units can be quickly and easily mounted without use of any tool, paste, or complicated fastening members, so that the cart bodies have reinforced corners, bottoms and double layer integrally formed handles.

While I have illustrated and described the preferred embodiments of my invention, it is to be understood that I do not limit myself to the precise constructions herein disclosed and that various changes and modifications may be made within the scope of the invention as defined in the appended claims.

What we claim is:

1. A shopping cart having a set-up cart body and quickly attached wheel units, said cart body being formed from a one-piece blank made of foldable cardboard, said body having vertical front, rear and side panels defining a rectangular tube; a first flap attached by a fold to one end of the rear panel; a second flap attached by a fold to one end of the front panel; third and fourth flaps attached by folds to one end of the side panels respectively, all of the flaps being located at one end of said body, said side panels third and fourth flaps having center folds so that the cart body can be folded flat with portions of the side panels and third and fourth flaps turned inwardly between the front and rear panels, said rear and side panels and said first, third and fourth flaps having slots and adjacent holes formed therein; each of said slots having curved portions in the side panels and straight portions in the first, third and fourth flaps, each of the wheel units including an L-shaped bracket having curved flanges at ends of mutually perpendicular flat plates, so that the wheel brackets are slidable laterally in said slots to engage with the rear panel, first, third and fourth flaps, each of said flat plates having holes therein registering with other holes in the rear panel, first, third and fourth flaps; and double prong fasteners engaged in the registered holes and holding the wheel units on the cart body.

2. A shopping cart having a set-up cart body and quickly attached wheel units, said cart body being formed from a one-piece blank made of foldable cardboard, said body having vertical front, rear and side panels defining a rectangular tube; a first flap attached by a fold to one end of the rear panel; a second flap attached by a fold to one end of the front panel; third and fourth flaps attached by folds to one end of the side panels respectively, all of the flaps being located at one end of said body, said side panels third and fourth flaps having center folds so that the cart body can be folded flat with portions of the side panels and third and fourth flaps turned inwardly between the front and rear panels, said rear and side panels and said first, third and fourth flaps having slots and adjacent holes formed therein; each of the wheel units including an L-shaped bracket having an L-shaped clamp strip abutted to an L-shaped member including mutually perpendicular integrally joined flat plates, free ends of the clamp strip extending beyond the plates being formed with curved flanges engaging in said slots, each of the flat plates having holes therein registering with other holes in the clamp strip, rear panel, first, third and fourth flaps; and double prong fasteners engaged in the registered holes and holding the wheel units on the cart body.

3. A shopping cart having a set-up cart body and quickly attached wheel units, said cart body being formed from a one-piece blank made of foldable cardboard, said body having vertical front, rear and side panels defining a rectangular tube; a first flap attached by a fold to one end of the rear panel; a second flap attached by a fold to one end of the front panel, third and fourth flaps attached by folds to one end of the side panels respectively, all of the flaps being located at one end of said body, said side panels third and fourth flaps having center folds so that the cart body can be folded flat with portions of the side panels and third and fourth flaps turned inwardly between the front and rear panels, said rear and side panels and said first, third and fourth flaps having slots and adjacent holes formed therein; each of said slots having curved portions in the side panels and straight portions in the first, third and fourth flaps, each of the wheel units including an L-shaped bracket having curved flanges at ends of mutually perpendicular flat plates, so that the wheel brackets are slidable laterally in said slots to engage with the rear panel, first, third and fourth flaps, each of said flap plates having holes therein registering with other holes in the rear panel, first, third and fourth flaps; and double prong fasteners engaged in the registered holes and holding the wheel units on the cart body, said bracket including parallel, vertical flanges depending from one of said plates and rotatably supporting a wheel therebetween.

4. A shopping cart having a set-up cart body and quickly attached wheel units, said cart body being formed from a one-piece blank made of foldable cardboard, said body having vertical front, rear and side panels defining a rectangular tube; a first flap attached by a fold to one end of the rear panel; a second flap attached by a fold to one end of the front panel; third and fourth flaps attached by folds to one end of the side panels respectively, all of the flaps being located at one end of said body, said side panels third and fourth flaps having center folds so that the cart body can be folded flat with portions of the side panels and third and fourth flaps turned inwardly between the front and rear panels, said rear and side panels and said first, third and fourth flaps having slots and adjacent holes formed therein; each of the wheel units including an L-shaped bracket having an L-shaped clamp strip abutted to an L-shaped member including mutually perpendicular integrally joined flat plates, free ends of the clamp strip extending beyond the plates being formed with curved flanges engaging in said slots, each of the flat plates having holes therein registering with other holes in the clamp strip, rear panel, first, third and fourth flaps; and double prong fasteners engaged in the registered holes and holding the wheel units on the cart body, said bracket including depending, parallel, vertical flanges rotatably supporting a wheel therebetween, said clamp strip having a wall portion extending between the depending vertical flanges to prevent turning movement of the flat plates relative to the clamp strip.

5. A wheel unit for a shopping cart having a set-up cart body with slots and holes formed in panels and flaps of the cart body, said unit comprising an L-shaped bracket having curved flanges at ends of mutually perpendicular flat plates, so that the wheel brackets are slidable laterally in said slots to engage with said panels and flaps, each of the flat plates having holes therein registering with the holes in one of the panels and in said flaps for receiving fastener members to hold the bracket on the cart body, said bracket including depending parallel, vertical flanges rotatably supporting a wheel therebetween, said flanges being recessed inwardly of the lateral edges of the bracket so that the wheels are wholly disposed underneath the bottom of the cart body.

6. A shopping cart having a set-up cart body and quickly attached wheel units, said cart body being formed from a one-piece blank made of foldable cardboard, said body having vertical front, rear and side panels defining a rectangular tube; a first flap attached by a fold to one end of the rear panel; a second flap attached by a fold to one end of the front panel; third and fourth flaps attached by folds to one end of the side panels respectively, all of the flaps being located at one end of said body, said side panels third and fourth flaps having center folds so that the cart body can be folded flat with portions of the side panels and third and fourth flaps turned inwardly between the front and rear panels, said rear and side panels and said first, third and fourth flaps having slots and adjacent holes formed therein; each of said slots having curved portions in the side panels and straight portions in the first, third and fourth flaps, each of the wheel units including an L-shaped bracket having curved flanges at ends of mutually perpendicular flat plates, so that the wheel brackets are slidable laterally in said slots to engage with the rear panel, first, third and fourth flaps, each of said flat plates having holes therein registering with other holes in the rear panel, first, third and fourth flaps; and double prong fasteners engaged in the registered holes and holding the wheel units on the card body, said bracket including depending parallel, vertical flanges rotatably supporting a wheel therebetween, said flanges being recessed inwardly of the lateral edges of the bracket so that the wheels are wholly disposed underneath the bottom of the cart body.

7. A wheel unit for a shopping cart having a set-up cart body with slots and holes formed in a panel and flaps of the cart body, said unit comprising an L-shaped clamp strip and an L-shaped bracket member including two mutually perpendicular integrally joined flat plates, said strip having walls abutting sides of said plates and formed with curved flanges for engaging in said slots, each of the flat strips having holes registering with holes in the flat plates and registrable with the holes in said panel and flaps for receiving fastener members to hold the wheel unit on the cart body, the free ends of the L-shaped clamp strip extending beyond the edges of the flat plates.

8. A wheel unit for a shopping cart having a set-up cart body with slots and holes formed in a panel and flaps of the cart body, said unit comprising an L-shaped clamp strip and an L-shaped bracket member including two mutually perpendicular integrally joined flat plates, said strip having walls abutting sides of said plates and formed with curved flanges for engaging in said slots, each of the flat strips having holes registering with holes in the flat plates and registrable with the holes in said panel and flaps for receiving fastener members to hold the wheel unit on the cart body, the free ends of the L-shaped clamp strip extending beyond the edges of the flat plates, said bracket including depending, parallel, vertical flanges rotatably supporting a wheel therebetween, said clamp strip having a wall portion extending between the depending vertical flanges to prevent turning movement of the flat plates relative to the clamp strip.

References Cited by the Examiner
UNITED STATES PATENTS

| | | | |
|---|---|---|---|
| 2,478,563 | 8/1949 | Book | 280—47.17 X |
| 2,489,034 | 11/1949 | James | 229—52 |
| 2,533,895 | 12/1950 | Raveau | 280—47.32 |
| 3,087,740 | 4/1963 | Mitty et al. | 280—47.26 |
| 3,092,395 | 6/1963 | Mitty et al. | |
| 3,135,527 | 6/1964 | Knapp | 280—47.26 X |

BENJAMIN HERSH, *Primary Examiner.*

J. A. PEKAR, *Assistant Examiner.*